(12) United States Patent
Flotzinger

(10) Patent No.: US 7,311,352 B2
(45) Date of Patent: Dec. 25, 2007

(54) FRONT BUMPER COVER AND RADIATOR GRILLE

(75) Inventor: Franz Flotzinger, Kirchheim (DE)

(73) Assignee: Decoma (Germany) GmbH, Sulzbach (DE)

( * ) Notice: Subject to any disclaimer, the term of this patent is extended or adjusted under 35 U.S.C. 154(b) by 0 days.

(21) Appl. No.: 11/418,675

(22) Filed: May 5, 2006

(65) Prior Publication Data

US 2006/0249961 A1    Nov. 9, 2006

(30) Foreign Application Priority Data

May 6, 2005    (DE) ...................... 10 2005 021 895

(51) Int. Cl.
*B60R 19/04* (2006.01)
(52) U.S. Cl. .................... 296/193.1; 293/115
(58) Field of Classification Search ............ 296/193.1; 293/115, 120, 121; 180/68.1
See application file for complete search history.

(56) References Cited

U.S. PATENT DOCUMENTS

| 4,322,106 | A * | 3/1982 | Nespor ........................ 293/121 |
| 7,059,031 | B1 * | 6/2006 | Elwell et al. ............... 29/401.1 |
| 2005/0167998 | A1 * | 8/2005 | Pleet et al. .................. 293/115 |
| 2005/0218699 | A1 * | 10/2005 | Andre et al. ........... 296/193.09 |
| 2006/0181088 | A1 * | 8/2006 | Cobble et al. .............. 293/115 |

FOREIGN PATENT DOCUMENTS

| DE | 2927035 | 1/1981 |
| DE | 2927036 | 1/1981 |
| DE | 4336591 | 5/1994 |
| DE | 19546478 | 6/1997 |
| EP | 1433664 | 6/2004 |
| FR | 2840573 | 12/2003 |
| JP | 09104298 | 4/1997 |

OTHER PUBLICATIONS

English Abstract of FR 2840573.
English Abstract of DE 19546478.
English Abstract of JP 09104298.
English Abstract of DE 2927036.
English Abstract of DE 4336591.
(No English Abstract Available for DE 2927035).
English Abstract of FR 2840573, Dec. 12, 2003.
English Abstract of DE 19546478, Jun. 19, 1997.
English Abstract of JP 09104298, Apr. 22, 1997.
English Abstract of DE 2927036, Jan. 8, 1981.
English Abstract of DE 4336591, May 11, 1994.

* cited by examiner

*Primary Examiner*—Jason S Morrow
(74) *Attorney, Agent, or Firm*—Clark Hill PLC

(57) ABSTRACT

A front bumper cover is provided for an automotive vehicle. The front bumper cover includes a plurality of cover parts and a radiator grille having attachment points for fixedly securing the plurality of cover parts thereto. The radiator grille is adapted to mount to the vehicle thereby acting as a load-bearing element for supporting the front bumper cover.

18 Claims, 5 Drawing Sheets

FRONT BUMPER COVER AND RADIATOR GRILLE

BACKGROUND OF THE INVENTION

1. Field of the Invention

The present invention relates to a front bumper cover and, more particularly, to a front bumper cover including a radiator grille.

2. Description of the Related Art

Bumper covers, which are usually made of plastic, are currently used in virtually all automotive vehicles. The bumper covers are usually one-piece or, if made of several pieces, are divided approximately along a horizontal plane and are reinforced, if necessary, by means of additional components at the edge areas bordering on adjacent parts. These reinforcing parts are either foam parts made of expanded polypropylene or polyurethane, injection molded components, or metal parts which are attached to the cover by various means, such as by clipping, welding, adhesive bonding, screwing, or clamping.

German Patent DE 195 46 478 A1 discloses a bumper cover made of plastic which consists of at least two individual parts joined together along a vertical seam. A large-area joining plate is also provided for connecting the individual parts. The multi-part bumper cover described has the advantage that after a collision it may not always be necessary to replace the entire bumper cover but, instead, individual parts may be reused. A disadvantage of the bumper cover described is that the additional joining plate is required.

In the development of bumpers and bumper covers, more and more stringent requirements for the protection of pedestrians must be observed and met. Within these developments and associated initiatives, radiator grilles have been included in the assembly of the one-piece bumper cover. It is well known that in such one-piece bumper designs, the bumper cover, optionally fitted with additional reinforcing members, always acts as a load-bearing element.

Current design developments show radiator grilles with greatly enlarged dimensions. This is intended to establish an individual appearance for a brand, while also reducing costs compared with multi-sectional radiator grilles which have an upper radiator grille, a badge carrier plate and a lower area inlet grille. There are however some disadvantages. The non-uniformity of outer side parts of the bumper cover compared with the central radiator grille means that connecting bars are necessary, which are covered by a badge area of the radiator grille. In addition, there are large openings in the radiator grille which results in a high proportion of overspray during painting and hence high paint consumption. Moreover, because of their bulky nature fewer one-piece bumper covers can be processed for painting at a time.

SUMMARY OF THE INVENTION

According to the invention, a front bumper cover is provided for an automotive vehicle. The front bumper cover includes a plurality of cover parts and a radiator grille having attachment points for fixedly securing the plurality of cover parts thereto. The radiator grille is adapted to mount to the vehicle thereby acting as a load-bearing element for supporting the front bumper cover.

The construction of the front bumper cover according to the invention enables the radiator grille or mesh to be held satisfactorily in the front bumper cover such that it meets the stringent guidelines regarding the protection of pedestrians.

The front bumper cover is multi-sectional in construction. This is particularly advantageous in modern front bumper covers in which the radiator grille extends virtually to a spoiler. In this case, the centrally mounted radiator grille acts as a central support element for individual cover parts of the front bumper cover which are arranged at sides and a bottom of the radiator grille.

In the multi-part construction, the individual cover parts are preferably joined together in the region of their contact surface by additional fixing means of the front bumper cover.

The material used for the front bumper cover is preferably a plastic.

The individual cover parts of the front bumper cover are preferably connected to the radiator grille by push-in connections and/or latching connections. Alternatively, or in addition, hinged joints may be provided.

In the preferred embodiment, a lower protective bar or lower leg stiffener is provided as an additional connecting member. This lower protective bar located in the region of a sub-frame may thus be used as an additional connecting member between individual cover parts of the front bumper cover. It is important to ensure, among other things, that deformations caused by thermal expansion, for example, are prevented from occurring at the hinged points of attachment to the radiator grille.

If the front bumper cover is made in several parts, there are considerable cost advantages as smaller injection molding machinery can be used, a higher occupancy level can be achieved on paint shop skids, and a higher packing density of parts in transporting containers is possible. Moreover, inexpensive flat bed paint shops can be used instead of 3-D robot-operated paint shops.

It is also possible to use foil-backed components for the individual cover parts as joints between individual cover parts can be concealed. In addition, there is the possibility of customizing by using different center pieces, for example unpainted grained, chrome-plated or painted the same color as the vehicle.

Construction is also made easier by a reduction in component tolerances caused by the provision of compensating joints. Furthermore, weight can be reduced by eliminating duplicated material.

The radiator grille preferably has at least one recess for providing a push-in connection and/or latching connection for the individual cover parts. Preferably, the radiator grille has recesses, such as U-shaped channels, at the sides and bottom, into which the individual cover parts can be pushed and fixed by latching connections or separate fixing means.

In a preferred embodiment, the radiator grille is made from an impact-resistant plastic.

Further features and embodiments of the invention will become apparent from the description and the accompanying drawings.

It will be appreciated that the features recited hereinbefore and those to be described below may be used not only in the particular combination specified but also in other combinations or on their own without departing from the scope of the present invention.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENTS

Figure 1:
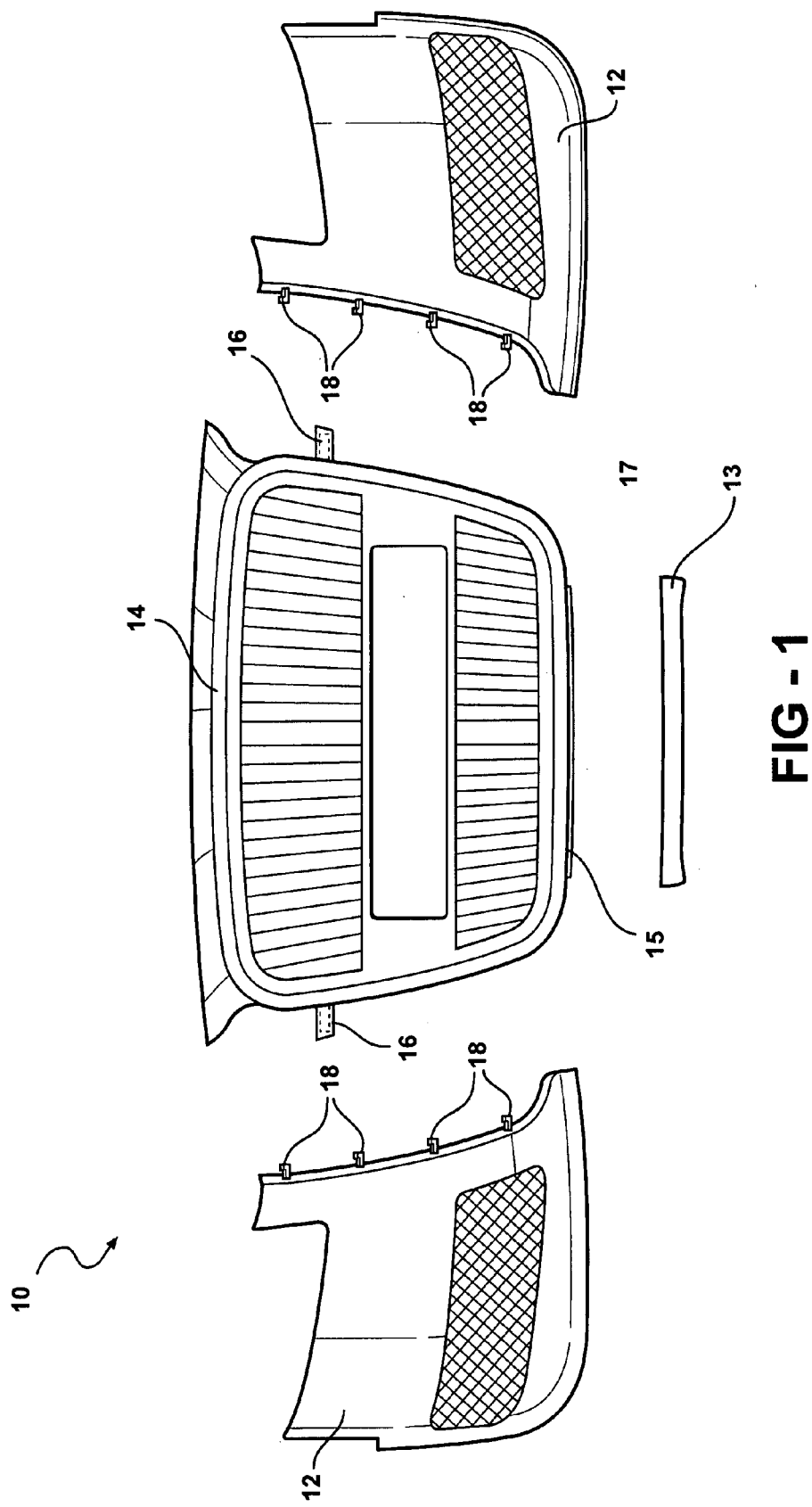
FIG. 1 is an exploded, front view of a front bumper cover with a radiator grille according to the invention.

Referring to FIG. 1, a multi-part front bumper cover is generally shown at 10. In the embodiment shown, the front bumper cover 10 includes two side cover parts 12 and a central cover part 13 which are to be connected to a radiator grille 14. The radiator grille 14 is adapted to mount to an automotive vehicle (not shown) such that the radiator grille 14 acts as a load-bearing element supporting the front bumper cover 10.

Figure 4:
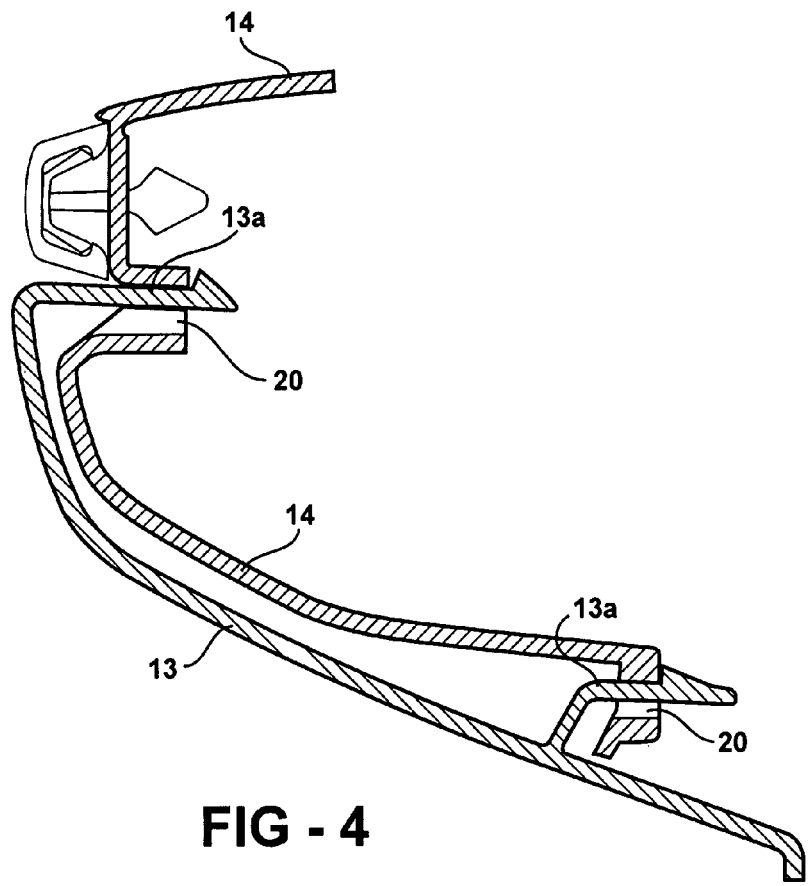
FIG. 4 is a cross-sectional view taken along lines A-A in FIG. 2.
Figure 5:
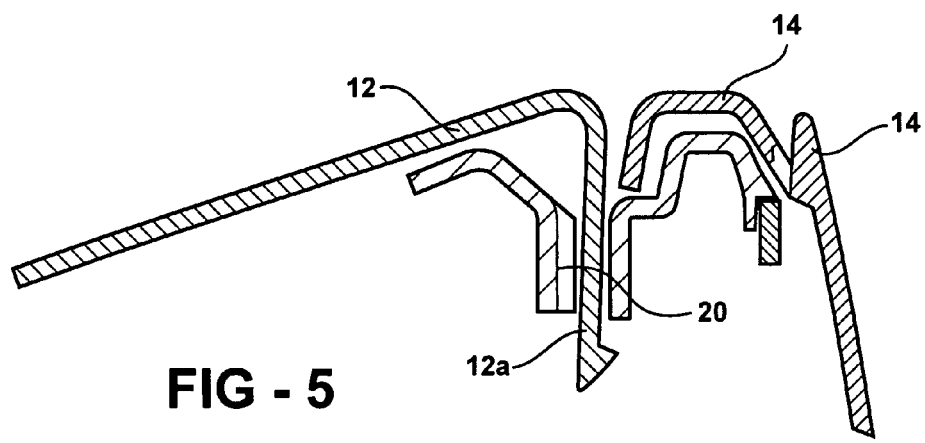
FIG. 5 is a cross-sectional view taken along lines B-B in FIG. 2.
Figure 6:
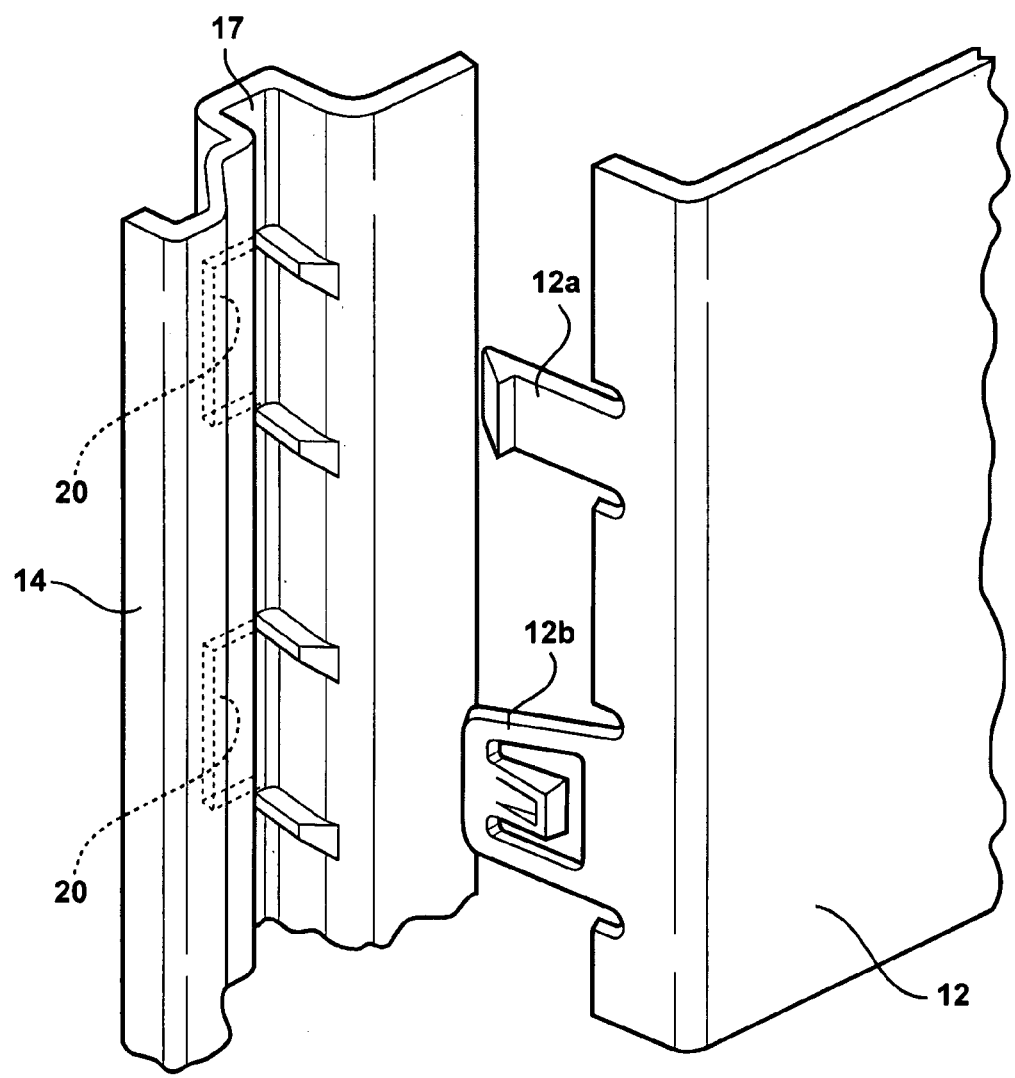
FIG. 6 is an enlarged, exploded view of detail 15 in FIG. 2.

In order to provide for the connection between the side cover parts 12 and the radiator grille 14, the radiator grille 14 includes a bracket-shaped attachment point 16 extending from each side. Additionally, the radiator grille 14 includes a U-shaped profile 17 extending around at least a portion of a peripheral edge thereof, as shown in FIG. 6. The side cover parts 12 include side push-in tabs 18 for fixedly securing the side cover parts 12 to the radiator grille 14. The side push-in tabs 18 may also be latching hooks of various construction 12a, 12b which are to be inserted in recesses 20 provided for this purpose in the radiator grille 14, as shown in FIGS. 5 and 6. Similarly, the central cover part 13 includes latching hooks 13a which are to be inserted in the recesses 20 along a lower edge 15 of the radiator grille 14, as shown in FIG. 4.

Alternatively, or in addition, hinged joints (not shown) may be provided. It is important to ensure that deformations caused by thermal expansion, for example, are prevented from occurring at the hinged points of attachment to the radiator grille 14.

Figure 2:
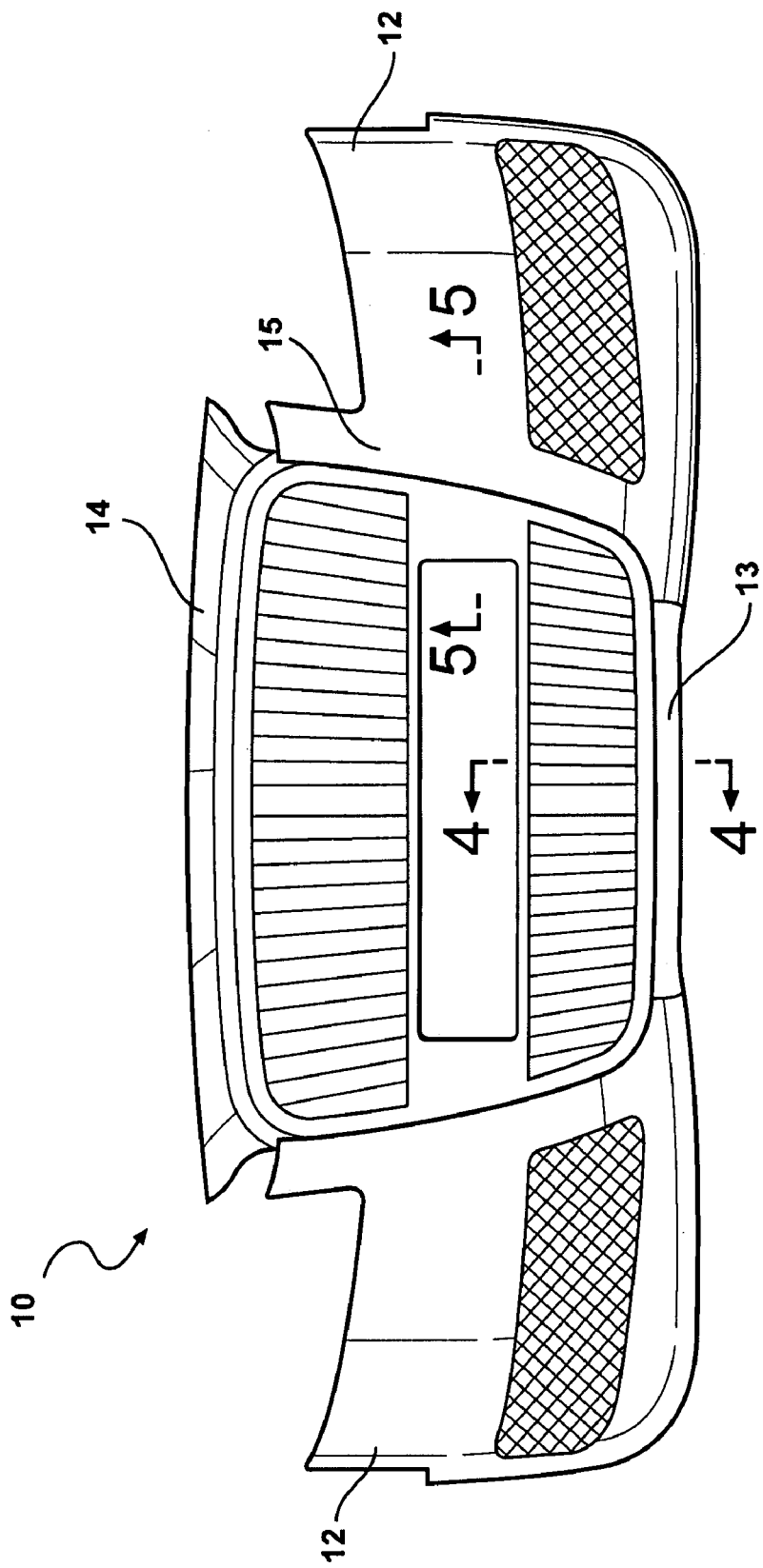
FIG. 2 is an assembled, front view of the front bumper cover with the radiator grille.

Referring to FIG. 2, the front bumper cover 10, including the side cover parts 12, the central cover part 13, and the radiator grille 14 are shown in an assembled position. The radiator grille 14 acting as the load-bearing element supporting the side cover parts 12 and the central cover part 13 form the front bumper cover 10 which, in particular, complies with requirements regarding the protection of pedestrians. The front bumper cover 10 or alternatively, the side cover parts 12 and the radiator grille 14 are made of plastic.

It is also possible to use foil-backed components for the side cover parts 12 as the joints between the individual cover parts can be concealed. In addition, there is the possibility of customizing the radiator grille 14 such that it is unpainted grained, chrome-plated or painted the same color as the vehicle.

Construction is also made easier by the reduction in component tolerances caused by the provision of compensating joints. Furthermore, weight can be reduced by eliminating duplicated material.

Figure 3:
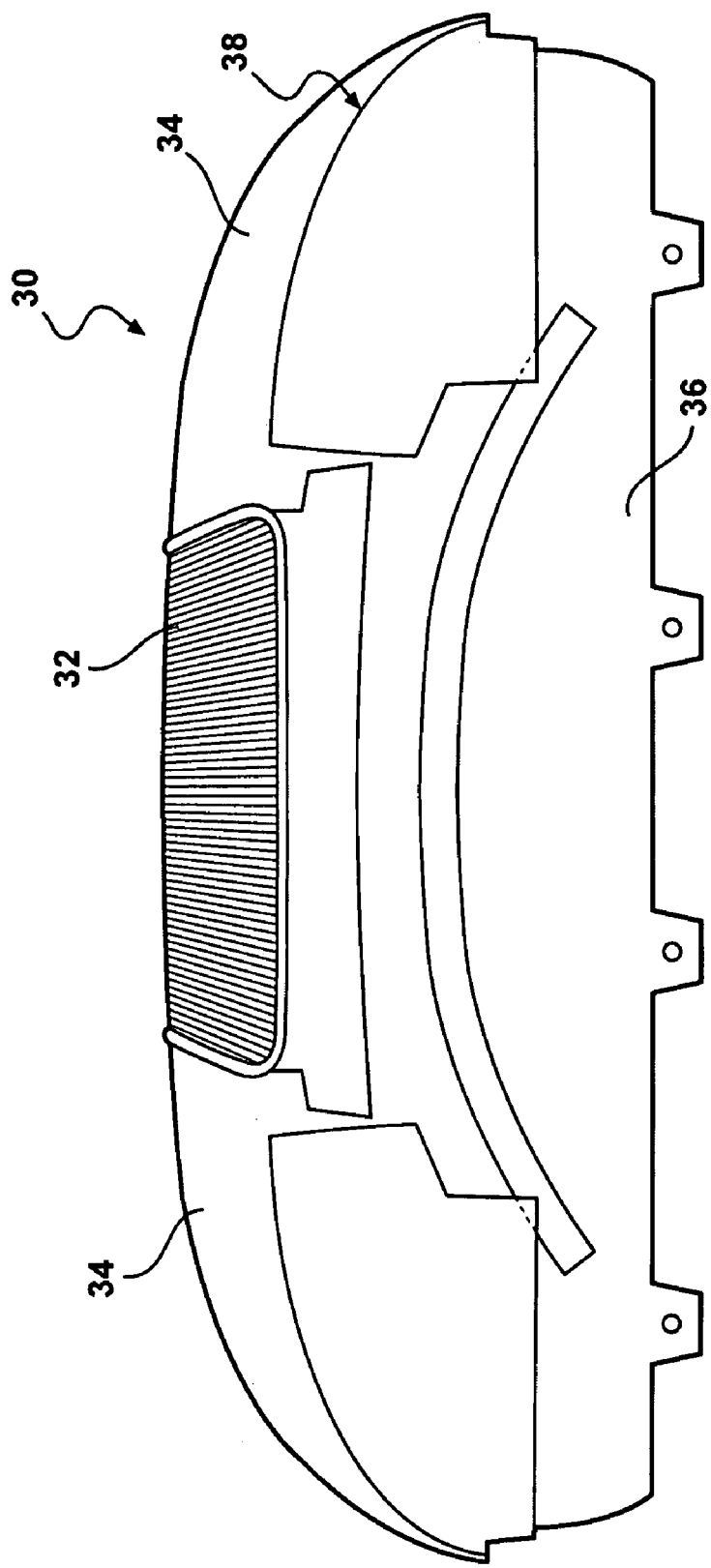
FIG. 3 is an assembled, plan view of an alternative embodiment of a front bumper cover with a radiator grille.

Referring to FIG. 3, an alternative embodiment of a front bumper cover is generally shown at 30 including a radiator grille 32 and side cover parts 34 fixedly secured thereto. In addition, a lower protective bar or lower leg stiffener 36 is provided as an additional connecting member. This lower protective bar 36 located in the region of a sub-frame may thus be used as an additional connecting member between individual cover parts of the front bumper cover 30.

A screw, rivet, expanding rivet, bracket member or welded joint, alone or in conjunction with latching connections having clips may be used as connecting elements 38 between the radiator grille 32, the side bumper parts 34 and the lower protective bar 36.

Since the front bumper cover 10 is made in several parts, there are considerable cost advantages. For example, smaller injection molding machinery can be used, a higher occupancy level can be achieved on paint shop skids, and a higher packing density of parts in transporting containers is possible. Moreover, inexpensive flat bed paint shops can be used instead of 3-D robot-operated paint shops.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A front bumper cover for an automotive vehicle comprising:
   at least two side cover parts;
   a central cover part; and
   a radiator grille having a pair of bracket attachment points for fixedly securing said at least two side cover parts to said radiator grille, said radiator grille adapted to mount to the vehicle thereby acting as a load-bearing element for supporting said front bumper cover.

2. A front bumper cover as set forth in claim 1 wherein at least a portion of a peripheral edge of said radiator grille includes a U-shaped profile for mating with said at least two side cover parts.

3. A front bumper cover as set forth in claim 2 wherein said U-shaped profile includes at least one pair of recesses.

4. A front bumper cover as set forth in claim 3 wherein said at least two side cover parts each include at least one push-in tab for engaging said at least one pair of recesses to fixedly secure said at least two side cover parts to said radiator grille.

5. A front bumper cover as set forth in claim 4 wherein said at least one push-in tab is a latching hook for engaging at least one pair of recesses to fixedly secure said at least two side cover parts to said radiator grille.

6. A front bumper cover as set forth in claim 1 wherein said radiator grille includes at least one recess disposed horizontally along a lower edge of said radiator grille for fixedly securing said central cover part to said radiator grille.

7. A front bumper cover as set forth in claim 6 wherein said central cover part includes at least one latching hook for engaging said at least one recess at said lower edge of said radiator grille to fixedly secure said central cover part thereto.

8. A front bumper cover as set forth in claim 1 including a lower protective bar provided as an additional connecting member for said cover parts.

9. A front bumper cover as set forth in claim 1 wherein said cover parts are made of plastic.

10. A bumper cover as set forth in claim 1 wherein said radiator grille is made of plastic.

11. A front bumper cover for an automotive vehicle comprising:
   a pair of side cover parts;
   a central cover part; and
   a radiator grille having a pair of bracket attachment points for fixedly securing said pair of side cover parts to said radiator grille, said radiator grille adapted to mount to the vehicle thereby acting as a load-bearing element to support said front bumper cover.

12. A front bumper cover as set forth in claim 11 wherein said radiator grille includes at least one recess disposed horizontally along a lower edge of said radiator grille for fixedly securing said central cover part to said radiator grille.

13. A front bumper cover as set forth in claim 12 wherein said central cover part includes at least one latching hook for engaging said at least one recess at said lower edge of said radiator grille to fixedly secure said central cover part thereto.

14. A front bumper cover as set forth in claim 13 wherein at least a portion of a peripheral edge of said radiator grille includes a U-shaped profile for mating with said pair of side cover parts.

15. A front bumper cover as set forth in claim 14 wherein said U-shaped profile includes at least one pair of recesses.

16. A front bumper cover as set forth in claim 15 wherein said pair of side cover parts each include at least one push-in tab for engaging said at least one pair of recesses to fixedly secure said pair of side cover parts to said radiator grille.

17. A front bumper cover as set forth in claim 16 wherein said at least one push-in tab is a latching hook for engaging said at least one pair of recesses to fixedly secure said pair of side cover parts to said radiator grille.

18. A front bumper cover as set forth in claim 17 wherein said pair of side cover parts, said central cover part, and said radiator grille are made of plastic.

* * * * *